(12) United States Patent
Pelliconi et al.

(10) Patent No.: US 7,381,773 B2
(45) Date of Patent: *Jun. 3, 2008

(54) CLEAR AND FLEXIBLE PROPYLENE POLYMER COMPOSITIONS

(75) Inventors: Anteo Pelliconi, S. M. Maddalena (IT); Angelo Lonardo, Naples (IT); Gabriele Mei, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 204 days.

This patent is subject to a terminal disclaimer.

(21) Appl. No.: 10/496,270

(22) PCT Filed: Nov. 22, 2002

(86) PCT No.: PCT/EP02/13145

§ 371 (c)(1),
(2), (4) Date: May 21, 2004

(87) PCT Pub. No.: WO03/046021

PCT Pub. Date: Jun. 5, 2003

(65) Prior Publication Data

US 2004/0266952 A1    Dec. 30, 2004

(30) Foreign Application Priority Data

Nov. 27, 2001 (EP) ................... 01128193

(51) Int. Cl.
*C08L 23/00* (2006.01)
*C08L 23/02* (2006.01)
*B32B 27/08* (2006.01)

(52) U.S. Cl. ............ 525/240; 525/243; 525/322; 525/323; 525/191; 428/520

(58) Field of Classification Search ............. 525/240, 525/191, 243, 322, 323; 428/520
See application file for complete search history.

(56) References Cited

U.S. PATENT DOCUMENTS

| | | | |
|---|---|---|---|
| 4,128,606 A | 12/1978 | Furutachi et al. | |
| 4,316,966 A | 2/1982 | Mineshima et al. | |
| 4,399,054 A | 8/1983 | Ferraris et al. | 252/429 B |
| 4,472,524 A | 9/1984 | Albizzati | 502/113 |
| 5,055,528 A | 10/1991 | Kioka et al. | |
| 5,066,723 A * | 11/1991 | Randall et al. | 525/194 |
| 5,115,030 A | 5/1992 | Tanaka et al. | |
| 5,145,819 A | 9/1992 | Winter et al. | |
| 5,286,791 A * | 2/1994 | DeNicola et al. | 525/71 |
| 5,324,800 A | 6/1994 | Welborn, Jr. et al. | |
| 5,414,027 A * | 5/1995 | DeNicola et al. | 522/112 |
| 6,054,406 A | 4/2000 | Smith | |
| 6,300,420 B1 | 10/2001 | Jääskeläinen et al. | |
| 6,306,518 B1 * | 10/2001 | Shah et al. | 428/516 |
| 6,395,831 B1 * | 5/2002 | Pelliconi et al. | 525/191 |
| 6,441,094 B1 | 8/2002 | Cecchin et al. | |
| 6,573,334 B1 | 6/2003 | Pitteri et al. | |
| 6,723,829 B1 * | 4/2004 | Malm et al. | 528/481 |
| 2005/0107538 A1 | 5/2005 | Pelliconi et al. | |
| 2006/0047071 A1 | 3/2006 | Pelliconi et al. | |

FOREIGN PATENT DOCUMENTS

| | | |
|---|---|---|
| EP | 0045977 | 2/1982 |
| EP | 129368 | 12/1984 |
| EP | 170255 | 2/1986 |
| EP | 353981 | 2/1990 |
| EP | 0361493 | 4/1990 |
| EP | 373660 | 6/1990 |
| EP | 395083 | 10/1990 |
| EP | 416815 | 3/1991 |
| EP | 420436 | 4/1991 |
| EP | 444446 | 9/1991 |
| EP | 485823 | 5/1992 |
| EP | 573862 | 12/1993 |
| EP | 643066 | 3/1995 |
| EP | 671404 | 9/1995 |
| EP | 674991 | 10/1995 |
| EP | 0728769 | 8/1996 |
| EP | 0782587 | 7/1997 |
| EP | 792814 | 9/1997 |
| EP | 844279 | 5/1998 |

(Continued)

*Primary Examiner*—Randy Gulakowski
*Assistant Examiner*—Olga Asinovsky
(74) *Attorney, Agent, or Firm*—William R. Reid

(57) ABSTRACT

A propylene polymer composition having a melt flow rate (MFR) value from 3 to 30 g/10 min, comprising (percent by weight): A) 50-90% of one or more propylene copolymer(s) having a content of xylene-insoluble moiety at room temperature of not less than 85%, selected from the group consisting of propylene-ethylene random copolymers containing from 1 to 7%, of ethylene; propylene-$C_4$-$C_8$ α-olefin copolymers containing 2-10% of the $C_4$-$C_8$ alpha-olefins; and propylene-ethylene-$C_4$-$C_8$ α-olefin copolymers containing 0.5-5% of ethylene and 2-6% Of $C_4$-$C_8$ α-olefins; and B) 10-50% of a copolymer of propylene containing from 8 to 40% of ethylene and optionally 1-10% of a $C_4$-$C_8$ alphaolefin; the said MFR value (MFR (2)) being obtained by subjecting to degradation a precursor composition comprising the same components A) and B) in the above said proportions, but having the MFR value (MER (1)) from 0.1 to 5 g/10 min with a ratio MFR (2) to MFR (1) of from 1.5 to 20.

7 Claims, No Drawings

FOREIGN PATENT DOCUMENTS

| | | |
|---|---|---|
| EP | 844280 | 5/1998 |
| EP | 1260546 | 11/2002 |
| WO | 91/04257 | 4/1991 |
| WO | 97/33117 | 9/1997 |
| WO | 0011076 | 3/2000 |
| WO | 00/039238 | 7/2000 |
| WO | 0039238 | 7/2000 |
| WO | 01/19915 | 3/2001 |
| WO | 03/031514 | 4/2003 |
| WO | 03/037981 | 5/2003 |
| WO | 03/051984 | 6/2003 |

\* cited by examiner

CLEAR AND FLEXIBLE PROPYLENE POLYMER COMPOSITIONS

This application is the U.S. national phase of International Application PCT/EP02/13145, filed Nov. 22, 2002.

The present invention relates to both thermoplastic elastomeric propylene polymer compositions and articles produced thereof.

The compositions as described hereinbelow are particularly suitable for the manufacture of films and injection-moulded items. In particular, the said articles have good flexibility, good impact properties even at low temperature, good optical properties, in particular transparency, and low release of chemical substances. Hence, the said articles are particularly suitable to be used in contact with food.

It is well known from the prior art that a high xylene-soluble moiety is desirable for the production of soft copolymers. However, high values of the xylene-soluble moiety result in large quantities of the hexane extractables, so that the soft copolymer results unsuited in the field of food packaging. The advantage of the compositions of the present invention it that they exhibit low values of the hexane extractables with relatively high values of the xylene soluble moiety.

Therefore the compositions of the present invention have a particularly valuable balance of the xylene-soluble moiety and the hexane-extractable moiety. The compositions have at desirable fluidity low values of the flexural modulus as well as low content of the hexane extractables.

Thus the present invention provides propylene polymer compositions having a melt flow rate (MFR) value from 3 to 30 g/10 min, preferably from 3 to 20 g/10 min, most preferably from 3 to 15 g/10 min, comprising (percent by weight):

A) from 50 to 90%, preferably from 60 to 85%, of one or more propylene copolymer(s) having a content of moiety insoluble in xylene at room temperature (about 23° C.) of not less than 85%, preferably not less than 90%, selected from the group consisting of (A1) random copolymers of propylene with ethylene containing from 1 to 7%, preferably from 1.5 to 6%, of ethylene; (A2) copolymers of propylene with one or more $C_4$-$C_8$ α-olefin(s) containing 2-10% of the $C_4$-$C_8$ α-olefin(s); (A3) copolymers of propylene with ethylene and one or more $C_4$-$C_8$ α-olefin(s) containing 0.5-5% of ethylene and 2-6% of $C_4$-$C_8$ α-olefin(s); and B) from 10 to 50%, preferably from 15 to 40%, of a copolymer of propylene containing from 8 to 40%, preferably from 8 to 30%, most preferably from 10 to 28%, of ethylene and optionally 1-10% of a $C_4$-$C_8$ α-olefin;

the said MFR value (MFR (2)) being obtained by subjecting to degradation a precursor composition comprising the same copolymers (A) and (B) in the above said proportions, but having the MFR value (MFR (1)) from 0.1 to 5 g/10 min, preferably from 0.5 to 4 g/10 min, with a ratio MFR (2) to MFR (1) of from 1.5 to 20, preferably from 2 to 15.

From the above definitions it is evident that the term "copolymer" includes polymers containing more than one kind of comonomers.

The $C_4$-$C_{10}$ α-olefins, which may be present as comonomers in the said propylene polymer or polymer composition, are represented by the formula $CH_2=CHR$, wherein R is an alkyl radical, linear or branched, with 2-8 carbon atoms or an aryl radical, such as $C_6$-$C_{10}$ aryl radical (in particular phenyl). Examples of the said $C_4$-$C_{10}$ α-olefins are 1-butene, 1-pentene, 1-hexene, 4-methyl-1-pentene and 1-octene. Particularly preferred is 1-butene.

As above mentioned, the precursor polymer compositions produced in the polymerization process have an MFR value ranging from 0.1 to 5 g/10 min, preferably from 0.5 to 4, measured according to ISO method 1133 (230° C., 2.16 kg). The said compositions are then subjected to a chemical degradation treatment (visbreaking) of the polymer chains according to processes well known in the art in order to obtain the required MFR values measured according to the said method. The chemical degradation of the polymer is carried out in the presence of free radical initiators, such as peroxides. Examples of radical initiators that can be used for this purpose are 2,5-dimethyl-2,5-di(tert-butylperoxide)-hexane and dicumyl-peroxide.

The degradation treatment is carried out by using the appropriate quantities of free radical initiators, and preferably takes place in an inert atmosphere, such as nitrogen. Methods, apparatus, and operating conditions known in the art can be used to carry out this process.

The most preferred propylene polymer compositions of the present invention comprise from over 60 to 85% by weight of copolymer (A) and from 15 to less than 40% by weight of copolymer (B).

The said propylene polymer compositions typically have a flexural modulus lower than 500 MPa, preferably lower than 450 MPa, most preferably lower than 400 MPa.

In the propylene polymer composition of the present invention the moiety of hexane extractable is preferably lower than 5.5 wt %, in particular lower than 4.5 wt %, according to the method described hereinbelow.

The xylene-soluble moiety of the propylene polymer compositions according to the present invention ranges preferably from 18 to 45 wt %, most preferably from 22 to 35 wt %. The ethylene content in the said moiety varies preferably from 18 to 30 wt %, more preferably from 20 to 38 wt %, the most preferred range being from 20 to 25 wt %.

Typically the weight ratio between the xylene-soluble moiety and the hexane-extractable moiety is more than 4.

The propylene polymer compositions of the present invention typically have a haze value lower than 20%, preferably lower than 18%, measured on films or plaques according to the method described hereinbelow.

Moreover, the present invention also provides an efficient and inexpensive process for preparing the said propylene polymer compositions. The process comprises the following stages:

1) preparing the previously said precursor composition by polymerizing the monomers in at least two sequential steps, wherein copolymers (A) and (B) are prepared in separate subsequent steps, operating in each step in the presence of the polymer formed and the catalyst used in the preceding step, and dosing the molecular weight regulator (preferably hydrogen) in such amounts as to obtain an MFR (1) value for the precursor composition of from 0.1 to 5 g/10 min, preferably from 0.5 to 4 g/10 min; and 2) subjecting the precursor composition obtained in 1) to a degradation treatment in order to obtain MFR (2) values for the final composition from 3 to 30 g/10 min. more preferably from 3 to 20 g/10 min, most preferably from 3 to 15 g/10 min, with a degradation ratio, in terms of ratio MFR (2) to MFR (1), of from 1.5 to 20, preferably from 2 to 15.

Such a preferred process is extremely convenient, as it avoids the separate preparation of the components (i.e. the copolymers) of the precursor composition and separate degradation treatments.

From the preceding description it should be clear that in the precursor composition the comonomer content and relative amounts of copolymers (A) and (B) are the same as in the final composition (after degradation). The degradation treatment has the effect of increasing the MFR value of the composition from MFR (1) to MFR (2), with the said values of the ratio between the two MFR values, namely MFR (2)/MFR (1), of from 1.5 to 20, preferably from 2 to 15.

The compositions of the present invention can be prepared by polymerization in two or more polymerization steps. Such polymerization is carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with a value of xylene insolubility at ambient temperature greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids. Particularly suitable electron-donor compounds are 1,3-diethers of formula:

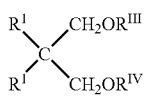

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769. Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl)fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2$.nROH adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are (tert-butyl)$_2$Si (OCH$_3$)$_2$, (cyclohexyl)(methyl)Si (OCH$_3$)$_2$, (cyclopentyl)$_2$Si (OCH$_3$)$_2$ and (phenyl)$_2$Si(OCH$_3$)$_2$. 1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the random copolymers are preferably prepared by using catalysts containing a phthalate as inside donor and (cyclopentyl)$_2$Si(OCH$_3$)$_2$ as outside donor, or the said 1,3-diethers as inside donors.

As previously said, the polymerization process can be carried out in two or more steps. The polymerization steps are preferably sequential, i.e. the first propylene copolymer, such as copolymer (A), and the second copolymer, such as copolymer (B), are prepared in separate subsequent steps, operating in each step, except the first step, in the presence of the polymer formed and the catalyst used in the preceding step. Clearly, when the composition contains additional polymers, it becomes necessary to add further polymerization steps to produce them. The said polymerization steps can be carried out in separate reactors, or in one or more reactors where gradients of monomer concentrations and polymerization conditions are generated. The catalyst is generally added only in the first step, however its activity is such that it is still active for all the subsequent step(s).

The regulation of the molecular weight is carried out by using known regulators, hydrogen in particular.

By properly dosing the concentration of the molecular weight regulator in the relevant steps, the previously described MFR values are obtained.

The whole polymerization process, which can be continuous or batch, is carried out following known techniques and operating in liquid phase, in the presence or not of inert diluent, or in gas phase, or by mixed liquid-gas techniques.

Reaction time, pressure and temperature relative to the two steps are not critical, however it is best if the temperature is from 20 to 100° C. The pressure can be atmospheric or higher.

The catalysts can be pre-contacted with small amounts of olefins (prepolymerization).

According to the preferred polymerization process the compositions of the present invention are produced by a sequential polymerization process as above described except that copolymer (A) is prepared by a gas-phase polymerization process carried out in at least two interconnected polymerization zones.

The process used in the first stage for polymerizing copolymer (A) according to the preferred process is illustrated in EP application 782 587.

In detail, the said process comprises feeding one or more monomer(s) to said polymerization zones in the presence of catalyst under reaction conditions and collecting the polymer product from the said polymerization zones. In the said process the growing polymer particles flow upward through one (first) of the said polymerization zones (riser) under fast fluidisation conditions, leave the said riser and enter another (second) polymerization zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerization zones can be effected by metering the amount of polymer leaving the downcomer using means suitable for controlling the flow of solids, such as mechanical valves.

The operating parameters, such as the temperature, are those that are usual in gas-phase olefin polymerization process, for example between 50 to 120° C.

This first stage process can be carried out under operating pressures of between 0.5 and 10 MPa, preferably between 1.5 to 6 MPa.

Advantageously, one or more inert gases are maintained in the polymerization zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

In the second stage of the preferred polymerization process copolymer (B) is typically produced with the conventional fluidized-bed gas-phase technologies.

The compositions can also be obtained by preparing separately the said copolymers by operating with the same catalysts and substantially under the same polymerization conditions as previously explained (except that the said copolymers will be prepared in separate polymerization steps) and then mechanically blending said copolymers in the molten state. Conventional mixing apparatuses, like screw extruders, in particular twin screw extruders, can be used.

The propylene polymers and propylene polymer compositions used for the articles of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as flexural modulus, heat distortion temperature (HDT), tensile strength at yield and transparency.

Typical examples of nucleating agents are p-tert.-butyl benzoate and 1,3- and 2,4-dibenzylidenesorbitols.

The nucleating agents are preferably added in quantities ranging from 0.05 to 2% by weight, more preferably from 0.1 to 1% by weight, with respect to the total weight.

The addition of inorganic fillers, such as talc, calcium carbonate and mineral fibers, also brings about an improvement to some mechanical properties, such as flexural modulus and HDT. Talc can also have a nucleating effect.

The main application sector of the composition of the present invention is that of cast films or sheets and injection-moulded containers. The cast films or sheets and injection-moulding articles are especially used in food packaging and food or drinks containers.

The cast films, sheets and injection-moulded items of the present invention can be prepared with the well-known processes.

The films of the present invention have thickness that typically ranges from 10 to 100 µm, while sheets have generally thickness greater than or equal to 100 µm.

Cast films/sheets of the present invention can be mono- or multilayered films/sheets. In multilayered films/sheets at least the base layer (also called "support layer") that is in contact with food comprises the propylene polymer composition according to the present invention. The other layer(s) may comprise other kinds of polymers, such as crystalline or semi-crystalline polymers of $C_2$-$C_6$ α-olefins, polyamide and poly(ethylene-co-vinyl acetate). Polyethylene is preferably selected from LLDPE and LDPE. Such multilayerd films/sheets are produced by coextruding the single films/sheets to be bonded using conventional process conditions.

The following examples are given to illustrate the present invention without limiting purpose.

The data relating to the polymeric materials and the films of the examples are determined by way of the methods reported below.

Melt Flow Rate: Determined according to ISO method 1133 (230° C., 2.16 kg).

Solubility in xylene: Determined as follows.

2.5 g of polymer and 250 mL of xylene are introduced in a glass flask equipped with a refrigerator and a magnetical stirrer. The temperature is raised in 30 minutes up to the boiling pint of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 mL of the filtered liquid is poured in a previously weighed aluminum container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated. The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Intrinsic viscosity (IV): Determined in tetrahydronaphthaline at 135° C.

Hexane extractable on film or plaque: Determined according to FDA 177, 1520, by suspending in an excess of hexane a specimen of the composition. The specimen is a film or plaque having thickness of 100 μm. The film is prepared by extrusion. The plaque is prepared by compression molding. The suspension is put in an autoclave at 50° C. for 2 hours. Then the hexane is removed by evaporation and the dried residue is weighted.

Melting temperature melting enthalpy and crystallization temperature: Determined by DSC with a temperature variation of 20° C. per minute.

Ethylene content: Determined by IR spectroscopy.

Ductile/Brittle transition temperature: Determined according to Basell internal method MTM 17324, available upon request.

Flexural modulus: Determined according to ISO method 178.

Stress at yield and at break: Determined according to ISO method 527.

Elongation at yield and at break: Determined according to ASTM method D-882.

IZOD impact strength: Determined according to ISO method 180.

Haze on film: Determined according to ASTM method D 1003/61.

Energy at break at −20° C.: Determined according to Basell internal method MTM 17324, available upon request.

Gloss on film: Determined according to ASTM method 523/89

EXAMPLES 1-3

In the following examples a precursor composition is prepared by polymerizing propylene and ethylene under continues conditions in a plant comprising a gas-phase polymerization apparatus and then subjected the thus obtained composition to degradation to produce a final composition according to the invention.

The catalyst employed comprises a catalyst component prepared by analogy with example 5 of EP-A-728 769 but using microspheroidal $MgCl_2.1.7C_2H_5OH$ instead of $MgCl_2.2.1C_2H_5OH$. Such catalyst component is used with dicyclopentyldimethoxysilane as external donor and with triethylaluminium (TEAl). The weight ratio TEAl/catalyst component is 5. The weight ratio TEAl/external donor is 4.

Firstly, copolymer (A) is produced in the gas-phase polymerisation apparatus in the presence of the said catalyst. The apparatus comprises two interconnected cylindrical reactors (riser and downcomer). Fast fluidisation conditions are established in the riser by recycling gas from the gas-solid separator.

The thus produced copolymer (A) is successively sent into a conventional fluidised bed reactor where copolymer (B) is produced in the gas phase reactor downstream.

The polymer particles exiting the second reactor are subjected to a steam treatment to remove the reactive monomers and volatile substances and then dried.

Other operative conditions and the characteristics of the produced polymers are indicated in the tables.

The polymer particles thus obtained, which constitute the precursor composition, are mixed with 2,5-dimethyl-2,5-di (ter-butylperoxy)hexane, which acts as initiator of free radicals in the subsequent extrusion treatment.

A polymer mixture containing the following amount (parts by weight) of components is prepared:

1) 99.72 parts of polymer composition;

2) 0.03 part of 2,5-bis(tert-butylperoxy)-2,5-dimethylhexane; and 3) 0.05 part of calcium stearate;

4) 0.05 part of oil; and 5) 0.15 part of additive stabilizers.

Then the polymer mixture is placed in a twin screw extruder Berstorff (L/D=33) and extruded in the following operating conditions:

temperature of feeding part: 190-210° C.;

melt temperature: 240° C.;

temperature of die part: 230° C.;

flow rate: 12.6 kg/h;

rotational speed of the screw: 250 rpm.

The compositions and main properties of the samples together with the main operating conditions are reported in Table 1.

TABLE 1

| | Example | | |
|---|---|---|---|
| | 1 | 2 | 3 |
| Polymerisation conditions and analysis of poly(propylene-co-ethylene) (A) produced in the gas-phase polymerization apparatus | | | |
| Temperature (° C.) | 70 | 70 | 70 |
| $C_2^-/(C_2^- + C_3^-)$ (gas ratio) (mol/mol) | 0.04 | 0.04 | 0.04 |
| Ethylene content (wt %) | 3.8 | 4 | 4 |
| MFR (g/10 min) | 4.3 | 4 | 1.4 |
| Xylene solubility (wt %) | 7.3 | 8.5 | 7.9 |
| Polymerisation conditions and analysis of poly(propylene-co-ethylene) (B) produced in the 2$^{nd}$ reactor | | | |
| Temperature (° C.) | 85 | 85 | 85 |
| $C_2^-/(C_2^- + C_3^-)$ (gas ratio) (mol/mol) | 0.12 | 0.15 | 0.15 |
| Ethylene content (wt %) | 24 | 26 | 26 |
| Analysis of the polymer composition | | | |
| Copolymer (B) content (wt %) | 20 | 19 | 24 |
| Ethylene content (wt %) | 8 | 8.2 | 9.3 |
| Ethylene content in the xylene-soluble moiety (wt %) | 22.5 | 22.2 | 23.5 |
| Ethylene content in the xylene-insoluble moiety (wt %) | 4 | 3.7 | 4.5 |
| Properties of the precursor polymer composition | | | |
| MFR (g/10 min) | 2.8 | 2.3 | 0.97 |
| I.V. of the xylene-soluble moiety (dL/g) | 2.54 | 2.47 | 2.45 |
| Flexural modulus (MPa) | 560 | 490 | — |
| Properties of the visbroken polymer composition | | | |
| MFR (g/10 min) | 7.5 | 7.3 | 6.9 |
| Xylene solubility (wt %) | 24.1 | 23.5 | 28.8 |
| Xylene insolubility (wt %) | 75.9 | 76.5 | 71.2 |
| I.V. of the xylene-soluble moiety (dL/g) | 1.69 | — | 1.58 |
| I.V. of the xylene-insoluble moiety (dL/g) | 1.49 | — | 1.57 |
| Hexane-extractable moiety on film (100 μm) (wt %) | 3.6 | 3.8 | 3.8 |
| Hexane-extractable moiety on plaque (100 μm) (wt %) | 5.5 | — | 7.4 |
| Melting temperature (° C.) | 146.8 | 144.9 | 147.5 |
| Melting enthalpy (J/g) | 67.2 | 60.8 | 59.3 |
| Crystallisation temperature (° C.) | 100.2 | 100.4 | 101.5 |
| Ductile/Brittle transition temperature (° C.) | −25 | −32 | −40 |
| Flexural modulus (MPa) | 490 | 470 | 370 |
| Stress at yield (MPa) | 17 | 17 | 14 |
| Elongation at yield (%) | 16 | 16.4 | 19.8 |
| Stress at break (MPa) | 24 | 16 | 17 |
| Elongation at break (%) | 422 | 420 | 424 |
| IZOD impact strength at 23° C. (kJ/m$^2$) | 15.8 | 14.1 | — |
| IZOD impact strength at −20° C. (kJ/m$^2$) | 2.6 | 2 | 3.6 |
| Energy at break at −20° C. (J) | 12.6 | 12.6 | 12.3 |
| Haze on film (50 μm) (%) | 12.9 | 17.7 | 11 |
| Gloss on film (50 μm) (%) | 51 | 43 | 56.1 |

The exemplified compositions have hexane extractable levels (HE) below 4 wt %. The level of the HE is measured on a 100 μm thick cast film prepared according to the FDA regulation. The measured values are well below the FDA limit (5.5 wt %).

The exemplified compositions show low values of the flexural modulus (flexural modulus values lower than 500 MPa) and good impact properties at low temperature (Energy at break at −20° C. of about 12 J).

50 μm thick cast films produced with the exemplified composition according to the present invention show also low values of the tensile elastic modulus and of the tensile stress at yield, and very good optical properties.

Table 1 reports the characteristics of the compositions described in examples 1 and 2 before and after the degradation. With respect to the as-polymerised compositions, the chemical degraded compositions exhibit higher fluidity, the same xylene-soluble content and a slightly lower value of the flexural modulus.

COMPARATIVE EXAMPLES 1c-5c

Compositions of examples 1c-5c are prepared by polymerizing propylene and ethylene by sequential polymerization.

In the first gas-phase polymerization reactor copolymer (A) (a propylene/ethylene copolymer) is produced by feeding in a continuos and constant flow the prepolymerized catalyst system, hydrogen (used as molecular weight regulation) and propylene and ethylene in gas phase.

The copolymer produced in the first reactor is discharged in a continues flow and, after having been purged of unreacted monomers, is introduced in a continuous flow into the second gas-phase reactor, together with quantitatively constant flows of hydrogen, propylene and ethylene in the gas state.

The polymer particles exiting the second reactor are subjected to a steam treatment to remove the reactive monomers and volatile substances and then dried.

The catalyst used is the same as that used in examples 1-3.

The polymer particles are not subjected to chemical degradation to obtain the desired MFRL values since the desired MFRL values are obtained directly in polymerization.

Table 2 reports the polymerization conditions and compositions of the copolymers thus obtained.

TABLE 2

| | Comparative Example | | | | |
|---|---|---|---|---|---|
| | 1c | 2c | 3c | 4c | 5c |
| Polymerisation conditions and analysis of poly(propylene-o-ethylene) (A) produced in the 1$^{st}$ reactor | | | | | |
| Temperature (° C.) | 80 | 80 | 80 | 80 | 80 |
| Ethylene content (wt %) | 4.3 | 3.7 | 4.2 | 3.5 | 3.3 |
| MFR (g/10 min) | 10.5 | 13.2 | 8.8 | 11.4 | 11.3 |
| Xylene solubility (wt %) | 8.0 | 6.8 | 7.9 | 6.5 | 6 |
| Polymerisation conditions and analysis of poly(propylene-co-ethylene) (B) produced in the 2$^{nd}$ reactor (calculated) | | | | | |
| Temperature (° C.) | 65 | 65 | 65 | 65 | 65 |
| $C_2^-/(C_2^- + C_3^-)$ (gas ratio) (mol/mol) | 0.2 | 0.17 | 0.2 | 0.2 | 0.2 |
| Ethylene content (wt %) | 28 | 26 | 28 | 28 | 28 |
| Xylene solubility (wt %) | 94 | 94 | 94 | 94 | 94 |
| Analysis and properties of the polymer composition | | | | | |
| Copolymer (B) content (wt %) | 16 | 33 | 21 | 15 | 18 |
| Ethylene content (wt %) | 8.0 | 11.2 | 9.1 | 7.1 | 7.8 |
| MFR (g/10 min) | 8.0 | 7.7 | 6.7 | 9.3 | 9.7 |
| Xylene solubility (wt %) | 21.8 | 35.4 | 26.1 | 20.5 | 22.8 |
| I.V. of the xylene-soluble moiety (dL/g) | 1.61 | 1.83 | 1.62 | 1.61 | 1.45 |
| I.V. of the xylene-insoluble moiety (dL/g) | 1.65 | 1.55 | 1.67 | 1.65 | 1.60 |
| Hexane-extractable moiety on plaque (100 μm) (wt %) | 7.5 | 13.1 | 9.4 | 7.2 | 8.8 |

With respect to the compositions 1 and 3, comparative compositions 1c-5c show similar values of the final MFR, intrinsic viscosity of the xylene-soluble and -insoluble moiety and ethylene content. The random matrix of the composition is also similar.

The hexane extractables are measured on a 100 μm thick plaque obtained by compression moulding. The value of the hexane extractables measured on a 100 μm thick plaque is higher than that of the hexane extractables measured on a 100 μm thick cast film; however this method is often used as a low amount of material is required. With respect to compositions of comparative examples 1c-5c, compositions 1 and 3 showed considerably lower values of the ratio between the hexane extractables and the xylene soluble fraction.

The invention claimed is:

1. A propylene polymer composition comprising (percent by weight):
    A) from 60 to 90% of one or more propylene copolymer (s) having a content of moiety insoluble in xylene at room temperature of not less than 85%, selected from the group consisting of (A1) random copolymers of propylene with ethylene containing from 1 to 7%, of ethylene; (A2) copolymers of propylene with one or more $C_4$-$C_8$ α-olefin(s) containing 2-10% of the $C_4$-$C_8$ α-olefin(s); and (A3) copolymers of propylene with ethylene and one or more $C_4$-$C_8$ α-olefin(s) containing 0.5-5% of ethylene and 2-6% of $C_4$-$C_8$ α-olefins; and
    B) from 10 to 40% of a copolymer of propylene containing from 8 to 30% of ethylene and optionally 1-10% of a $C_4$-$C_8$ α-olefins;
    wherein the propylene polymer composition has a haze value lower than 20%, a flexural modulus lower than 500 MPa, an MFR(2) value of from 3 to 30 g/10 min obtained by subjecting to degradation a precursor composition comprising the same copolymers (A) and (B) in the above said proportions having an MFR(1) value of from 0.1 to 5 g/10 min, with a ratio MFR (2) to MFR (1) of from 1.5 to 20.

2. The composition of claim 1, wherein copolymer (A) is from 60 to 85% and copolymer (B) is from 15 to 40% by weight.

3. The composition of claim 1, wherein copolymer (B) contains from 10 to 28% by weight of ethylene.

4. A process for preparing a propylene polymer composition comprising:
    A) from 60 to 90% of one or more propylene copolymer (s) having a content of moiety insoluble in xylene at room temperature of not less than 85%, selected from the group consisting of (A1) random copolymers of propylene with ethylene containing from 1 to 7%, of ethylene; (A2) copolymers of propylene with one or more $C_4$-$C_8$ α-olefin(s) containing 2-10% of the $C_4$-$C_8$ α-olefin(s); and (A3) copolymers of propylene with ethylene and one or more $C_4$-$C_8$ α-olefin(s) containing 0.5-5% of ethylene and 2-6% of $C_4$-$C_8$ α-olefins; and
    B) from 10 to 40% of a copolymer of propylene containing from 8 to 30% of ethylene and optionally 1-10% of a $C_4$-$C_8$ α-olefins;
    the process comprising the following stages:
    1) preparing a precursor composition comprising the copolymers (A) and (B) in the above said proportions by polymerizing the monomers in at least two sequential steps, wherein copolymers (A) and (B) are prepared in separate subsequent steps, operating in each step in the presence of the polymer formed and the catalyst used in the preceding step, and dosing the molecular weight regulator in such amounts as to obtain an MFR (1) value for the precursor composition of from 0.1 to 5 g/10 min; and
    2) subjecting the precursor composition obtained in 1) to a degradation treatment in order to obtain an MFR (2) values for the final composition from 3 to 30 g/10 min, with a degradation ratio, in terms of ratio MFR (2) to MFR (1), of from 1.5 to 20, the composition having a haze value lower than 20%, and a flexural modulus lower than 500 MPa.

5. The process according to claim 4, wherein copolymer (A) is prepared by a gas-phase polymerization process carried out in at least two interconnected zones.

6. A mono- or multilayer cast film or sheet wherein at least one layer comprises a propylene polymer comprising:
    A) from 60 to 90% of one or more propylene copolymer (s) having a content of moiety insoluble in xylene at room temperature of not less than 85%, selected from the group consisting of (A1) random copolymers of propylene with ethylene containing from 1 to 7%, of ethylene; (A2) copolymers of propylene with one or more $C_4$-$C_8$ α-olefin(s) containing 2-10% of the $C_4$-$C_8$ α-olefin(s); and (A3) copolymers of propylene with ethylene and one or more $C_4$-$C_8$ α-olefin(s) containing 0.5-5% of ethylene and 2-6% of $C_4$-$C_8$ α-olefins; and
    B) from 10 to 40% of a copolymer of propylene containing from 8 to 30% of ethylene and optionally 1-10% of a $C_4$-$C_8$ α-olefins;
    wherein the propylene polymer composition has a haze value lower than 20%, a flexural modulus lower than 500 MPa, an MFR(2) value of from 3 to 30 g/10 min obtained by subjecting to degradation a precursor composition comprising the same copolymers (A) and (B) in the above said proportions having an MFR (1) value of from 0.1 to 5 g/10 min, with a ratio MFR (2) to MFR (1) of from 1.5 to 20.

7. An injection-moulded container prepared with a composition comprising a propylene polymer comprising:
    A) from 60 to 90% of one or more propylene copolymer (s) having a content of moiety insoluble in xylene at room temperature of not less than 85%, selected from the group consisting of (A1) random copolymers of propylene with ethylene containing from 1 to 7%, of ethylene; (A2) copolymers of propylene with one or more $C_4$-$C_8$ α-olefin(s) containing 2-10% of the $C_4$-$C_8$ α-olefin(s); and (A3) copolymers of propylene with ethylene and one or more $C_4$-$C_8$ α-olefin(s) containing 0.5-5% of ethylene and 2-6% of $C_4$-$C_8$ α-olefins; and
    B) from 10 to 40% of a copolymer of propylene containing from 8 to 30% of ethylene and optionally 1-10% of a $C_4$-$C_8$ α-olefins;
    wherein the propylene polymer composition has a haze value lower than 20%, a flexural modulus lower than 500 MPa, and an MFR(2) value of from 3 to 30 g/10 min obtained by subjecting to degradation a precursor composition comprising the same copolymers (A) and (B) in the above said proportions having an MFR (1) value of from 0.1 to 5 g/10 mm, with a ratio MFR (2) to MFR (1) of from 1.5 to 20.

* * * * *